US005737456A

United States Patent [19]
Carrington et al.

[11] Patent Number: 5,737,456
[45] Date of Patent: Apr. 7, 1998

[54] METHOD FOR IMAGE RECONSTRUCTION

[75] Inventors: Walter A. Carrington, Worcester; Kevin E. Fogarty, Hubbardston, both of Mass.

[73] Assignee: University of Massachusetts Medical Center, Worcester, Mass.

[21] Appl. No.: 488,938

[22] Filed: Jun. 9, 1995

[51] Int. Cl.$^6$ ................................................. G06K 9/42
[52] U.S. Cl. .......................... 382/299; 382/254; 382/128; 364/413.19
[58] Field of Search .................................. 382/298, 131, 382/128, 254, 263, 265, 260, 299, 300, 293, 276; 356/124, 124.5, 125, 126, 127; 364/571.01, 571.02, 571.04, 571.05, 572, 576, 577, 413.13, 413.18, 413.19

[56] References Cited

U.S. PATENT DOCUMENTS

| | | | |
|---|---|---|---|
| 5,043,570 | 8/1991 | Takabayashi | 250/216 |
| 5,047,968 | 9/1991 | Carrington et al. | 364/574 |
| 5,054,100 | 10/1991 | Tai | 382/47 |
| 5,075,883 | 12/1991 | Friedman et al. | 364/553 |
| 5,535,291 | 7/1996 | Spencer et al. | 382/254 |

OTHER PUBLICATIONS

PCT Search Report for PCT/US96/06931.

Andrews et al., "Image Representations and Models", Digital Image Restoration, Chapter 3, 26–58, 1977.

Andrews et al., "Sources and Models of Degradations", Digital Image Restoration, Chapter 4, 61–89, 1977.

Andrews et al., "Preliminary Concepts in Image Restoration", Digital Image Restoration, Chapter 6, 113–125 1977.

Andrews et al., "Linear Algebraic Restoration", Digital Image Restoration, Chapter 8, 147–189, 1977.

Carrington et al., "3D Fluorescence Imaging of Single Cells Using Image Restoration", Noninvasive Techniques in Cell Biology, Chapter 3, 53–72, 1990.

Carrington et al., "Three–Dimensional Imaging on Confocal and Wide–Field Microscopes", Confocal Microscopy Handbook 152–161.

Carrington et al., "Image Restoration in 3D Microscopy with Limited Data", SPIE, Conference on Bioimaging and Two–Dimensional Spectroscopy, 1205:72–83, 1990.

Carrington et al., "3–D Molecular Distribution in Living Cells by Deconvolution of Optical Sections Using Light Microscopy", IEEE Proceedings 108–111, 1987.

(List continued on next page.)

*Primary Examiner*—Yon J. Couso
*Attorney, Agent, or Firm*—Fish & Richardson P.C.

[57] ABSTRACT

A method for processing a digitized image is described. The method includes the step of first generating a digitized image using an image-measuring system and representing the image as a vector g. A point spread function (PSF), represented as the function k(x,y,z), is also determined, with the PSF containing sub-pixels having a closer spacing than points in the g. Both the vector g and the function k(x,y,z) are then processed by: (a) selecting a vector c; (b) calculating the value of

$$\psi(c) = \frac{1}{2}\left[\iiint_V \left(\max\left(0, \sum_{i=1}^{N} c_i k_i(x,y,z)\right)\right)^2 dxdydz + \alpha|c|^2\right] - \sum_{i=1}^{N} c_i g_i$$

using the vectors g and c, and the function k(x,y,z); and, (c) iteratively repeating steps (a) and (b) to determine a value for c that minimizes $\Psi(c)$. The image is then reconstructed by substituting in $$f(x,y,z) = \max\left(0, \sum_{i=1}^{N} c_i k_i(x,y,z)\right)$$

the value for c that minimizes $\Psi(c)$ so that the processed image contains sub-pixels having a closer spacing than the points of the vector g.

20 Claims, 6 Drawing Sheets

OTHER PUBLICATIONS

Carter et al., "A Three-Dimensional View of Precusor Messenger RNA Metabolism Within the Mammalian Nucleus", Science 259:1330–1335, 1993.

Gull et al., "Maximum Entropy Method in Image Processing", IEEE Proceedings 131:646–659, 1984.

Loew et al., "Imaging in Five Dimensions: Time–Dependent Membrane Potentials in Individual Mitochondria", Biophysical Journal 65:2396–2407, 1993.

Moore et al., "Coupling of the $Na^+/C^{2+}$ Exchanger, $Na^+/K^+$ Pump and Sarcoplasmic Reticulum in Smooth Muscle", Nature 365:657660, 1993.

BEFORE RESTORATION    T=30    T=50
FIG. 9A              FIG. 9B  FIG. 9C

T=55    T=65    T=80
FIG. 9D  FIG. 9E  FIG. 9F

METHOD FOR IMAGE RECONSTRUCTION

BACKGROUND

This invention relates to methods of image reconstruction.

Conventional light microscopes equipped with optical detectors are used to acquire optical images of a variety of light-emitting or light-reflecting samples. Preferred detectors for these applications are charge-coupled devices (CCDs) which feature two-dimensional arrays (e.g., 512×512) of light-detecting pixels. Following exposure to light, each pixel in the CCD generates an electrical signal; the signals from the array of pixels can be combined to electronically reconstruct an image of, for example, a two-dimensional plane (i.e., "section") of a light-emitting sample. Three-dimensional images are formed by combining images taken at different sections.

Both two and three-dimensional images can be blurred or distorted during the imaging process. For example, when imaging a particular in-focus section of the sample, light from out-of-focus sections may also irradiate pixels in the CCD, thereby creating artifacts in the registered signal. Images may also suffer from loss of resolution if features of the sample are smaller than the individual pixels of the CCD. In this case, the signal from each pixel (defined by the convolution of the relatively low-resolution instrument response with the incident optical field) is not well resolved, and the resultant image will be blurred.

Optical imaging systems incorporating CCDs are used in a variety of applications. For example, these systems are used to reconstruct images from fluorescently labeled cells. Here, the features of the image are typically small, and thus it is desirable for the pixels of the detector to be as small as possible. To generate images having high signal-to-noise ratios, such systems often necessitate exposing the sample to high optical fluences or may require use of a very thin sample. Such fluences are undesirable, as they may result in photodamage or photobleaching of the sample. Moreover, standard CCD-based imaging methods require a large number of sections to reconstruct the three-dimensional image, resulting in prohibitively long data-acquisition times. This makes it impossible, for example, to monitor dynamic processes in living cells.

SUMMARY

The invention features a method and device for generating a high-resolution digital image from a relatively low-resolution digital image generated using a standard detector. The invention includes a processing method which, based on the response and pixel size of the detector, manipulates the low-resolution image to form the more desirable high-resolution image. Such images are particularly useful in imaging biological samples, such as cells, as fine features in these system are often obscured using conventional imaging techniques.

In general, in one aspect, the invention provides a method for processing a digitized image to form a processed image. The method includes the step of first generating a digitized image using an image-measuring system and representing the image as a vector g. A point spread function (PSF), represented as the function $k(x,y,z)$, is also determined, with the PSF containing sub-pixels having a closer spacing than points in the g. Both the vector g and the function $k(x,y,z)$ are then processed by: (a) selecting a vector c; (b) calculating the value of $\Psi(c)$ using the vector g, the selected vector c, and the function $k(x,y,z)$, where $$\Psi(c) = \frac{1}{2}\left[\int\int\int_V \left(\max\left(0, \sum_{i=1}^{N} c_i k_i(x,y,z)\right)\right)^2 dx\,dy\,dz + \alpha|c|^2\right] - \sum_{i=1}^{N} c_i g_i \quad (1)$$

and where $\alpha$ is a balancing term and V is a volume element; and, (c) iteratively repeating steps (a) and (b) to determine a value for c that minimizes $\Psi(c)$. The image is then reconstructed by substituting in $$f(x,y,z) = \max\left(0, \sum_{i=1}^{N} c_i k_i(x,y,z)\right) \quad (2)$$

the value for c that minimizes $\Psi(c)$ so that the processed image contains sub-pixels having a closer spacing than the points of the vector g. Typically, the value of $\alpha$ is chosen to selectively weight the need to fit the digitized image, and is between about $10^{-7}$ and $10^{-12}$.

In preferred embodiments, the spacing of the subpixels of $f(x,y,z)$ is selected during the processing, and the digitized image is generated by a CCD camera containing an array of pixels. The sub-pixels of the processed image have a closer spacing than the pixels of the CCD camera. In other preferred embodiments, prior to the processing step, multiple digitized images are generated. These images, for example, can be taken from multiple sections of an object using an optical system. For instance, the optical system can include a lens, and the multiple digitized images are generated by adjusting a position of the lens relative to the object. In this case, the method may further include the step of sequentially processing the multiple digitized images during the processing step.

In other preferred embodiments, the PSF is determined using a digitized image of a light-emitting object having a known size (e.g., a fluorescent sphere having a known diameter). Here, the digitized image is generated by a CCD camera containing an array of pixels. As before, the part of the processing method can include the step of additionally generating multiple digitized images of the object having a known size.

Preferably, the PSF is determined by first generating a digital image of the light-emitting object, and then solving for the PSF using the equation:

digital image=(PSF*PIXEL(x,y))*(BEAD(x,y,z)*BL) \quad (3)

wherein PIXEL(x,y) is a function that describes a light sensitivity profile the pixel of the CCD camera, BL is a spatial band limit of the optical system, and BEAD(x,y,z) is a dye distribution in the fluorescent sphere.

Preferably, all the processing and reconstructing steps are performed using a computer, and the detector used to generate the digitized images is a CCD.

In another aspect, the invention provides a method for increasing the resolution of a detector containing an array of pixels using the steps described above. As before, the resolution is increased so that the processed image contains sub-pixels having a closer spacing than the pixels of the detector, thereby increasing the resolution of the detector.

In yet another aspect, the invention provides an image-measuring system for generating a high-resolution digital image. The system contains an imaging system, including a lens and a pixel-containing detector, and a processor. The imaging-measuring system is used to implement the process steps described above.

The invention has many advantages. In particular, the method allows production of high-resolution, continuous images using conventional optical detectors that measure images in a discrete manner. The method reconstructs the image on a numerical "grid" (i.e., a theoretical reference framework) defined by an array of sub-pixels. The spacing between the sub-pixels need not be regular, and is finer than the spacing between the pixels of the detector. Thus, the method generates an image which has a higher resolution than that of the detector, which allows essentially continuous images to be formed from discrete data.

The method thus allows generation of high-resolution images, and can be used to identify especially fine features in a sample. Moreover, such images can be generated with a large dynamic range and contain substantially reduced out-of-focus haze. The method can also be used to accurately quantify the degree of optical radiation emanating from a sample.

The method also simplifies and expedites three-dimensional imaging reconstruction. Such images can be reconstructed using only a small number of two-dimensional image planes which can be taken at non-uniform distances along an axis of the sample. Image reconstruction can be performed with low light levels, and can thus be done using faint fluorescent probes, thereby allowing minimization of both light exposure and the required data acquisition time. The flexible measuring process also allows for a simplified data-acquisition process that can be performed rapidly using conventional, low-cost computers. Data acquisition protocols thus can be determined by the needs of the particular experiment, rather than by the need of a rigid processing method.

These advantages enable the method to be used in a large variety of imaging applications. In particular, the method can be used to image fluorescently labeled cells with high resolution. Such experiments can provide information on the distribution or binding of molecules to specific sub-cellular targets, a general phenomenon believed to underlie processes ranging from release of neurotransmitters to the coordination of oxidative and glycolytic energy metabolism. To accurately monitor these processes, images must be obtained with the highest possible collection efficiency, as excitation light levels which induce fluorescence in the targeted labels must be kept low to minimize photobleaching and other forms of optical damage.

The methods described herein also permit images to be measured and processed over short time periods, allowing near real-time imaging. Thus, when used to image fluorescently labeled cells, the method allows observation of some biologically important dynamic processes.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, the preferred methods and materials are described below. All publications, patent applications, patents, and other references mentioned herein are incorporated by reference. In addition, the materials, methods, and examples are illustrative only and not intended to be limiting.

Other features and advantages of the invention will be apparent from the detailed description, and from the claims.

DETAILED DESCRIPTION

Figure 1:
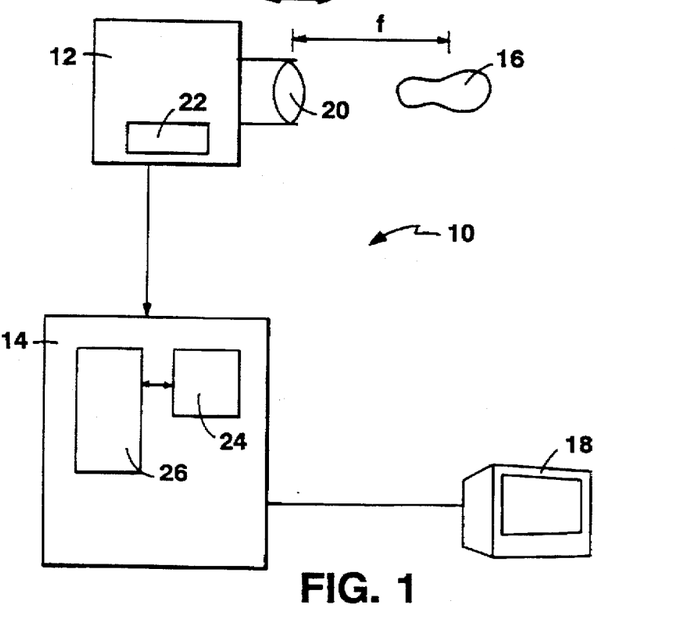
FIG. 1 is a schematic drawing of an image processing system used to implement the methods according to the invention.

Referring first to FIG. 1, an imaging system 10 featuring an image-measuring device 12 and a signal processing system 14 allows generation of a high-resolution, digital electronic image of a sample 16. The image can be measured on a very small scale with the image-measuring device 12 and, following processing with the processing system 14, may be viewed using a video monitor 18.

The image-measuring device 12 includes an optical imaging system, such as a lens 20 having a focal length f, for collecting an optical image from the sample 16, and a detector 22 for converting the optical image into a series of electronic signals. The image-measuring device 12 may be, for example, a microscope, confocal microscope, telescope, camera, lens system, or a combination thereof. The detector is preferably a CCD, diode array, digital video camera, or similar device capable of generating a digital electronic image in response to an incident optical field.

Once in a digital form, the image is processed using the processing system 14. This systems includes a memory unit 24 for storing data prior to and following processing, and a data processor 26 for performing the image-processing steps outlined in detail below. Following reconstruction using the processing system, a high-resolution image of the sample 16 can be viewed on the video monitor, stored in the memory unit 24, or printed onto a viewable medium.

Figure 2A:
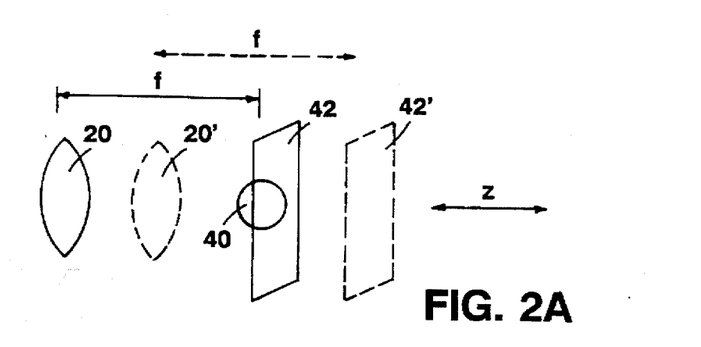
FIGS. 2A and 2B are side views of, respectively, an imaging lens system and a fluorescent bead used to calibrate the image-processing system, and the imaging lens system and an actual object to be imaged.

Referring now to FIG. 2A, during operation, a point spread function (PSF) of the imaging system is determined by imaging multiple sections of a standard light-emitting test material. For example, the test material can be a bead 40 having a small, well-known size (typically on the order of a few hundred nanometers), with a dye or other fluorescent material distributed uniformly therein. Determination of the PSF involves first acquiring a series of two-dimensional optical sections 42, 42' which, for example, may lie in (i.e., section 42), above, or below (i.e., section 42') a plane contained by the bead. As indicated in the figure, the sections are acquired by moving a lens 20 to different positions along the z axis relative to the bead, and then digitally recording the image. In all cases, the lens may be translated using electro-mechanical means known in the art, such as a computer-controlled stepper motor or piezoelectric device.

Images of sections lying above and below the plane of the bead result from detection of out-of-focus light; these test images thus indicate the ability of the image-measuring device 12 to monitor light emanating from points outside of the focal plane of the light-collecting lens 20. Images detected from each different section are stored in the memory unit of the processing system in the form of an x-y array of data points (i.e., a vector g). Using the algorithm described below, these data are processed to calculate the effective instrument PSF. Once calculated, the effective PSF can be stored in the memory unit of the processing system, where it is accessed during processing of an actual image. The PSF does not necessarily have to be recalculated for each acquired image.

The PSF is defined on a three-dimensional grid in which the sub-pixels have a finer spacing than the detector pixels. The spacing between sub-pixels can be arbitrarily set by the operator of the image-measuring device. Preferably, the spacing between the sub-pixels is less than about 100 nanometers; more preferably, the spacing is set at about 10 nanometers. Grid spacings significantly less than 10 nanometers do not result in significantly extending the resolution of the reconstructed image, and are thus not preferred. Moreover, images expressed on this grid size have increased numbers of data points, and thus require large amounts computer memory for storage.

Figure 3A:
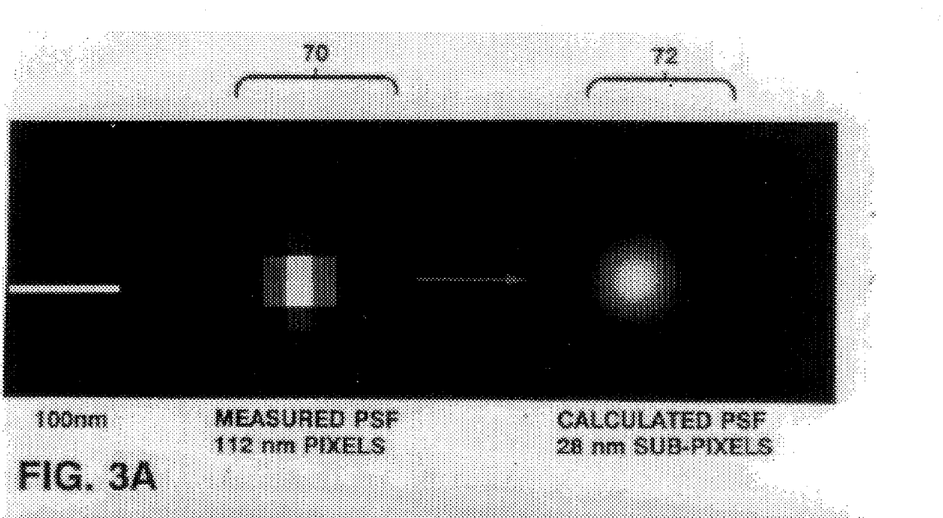
FIG. 3A is a top view of the measured and calculated point spread function.
Figure 3B:
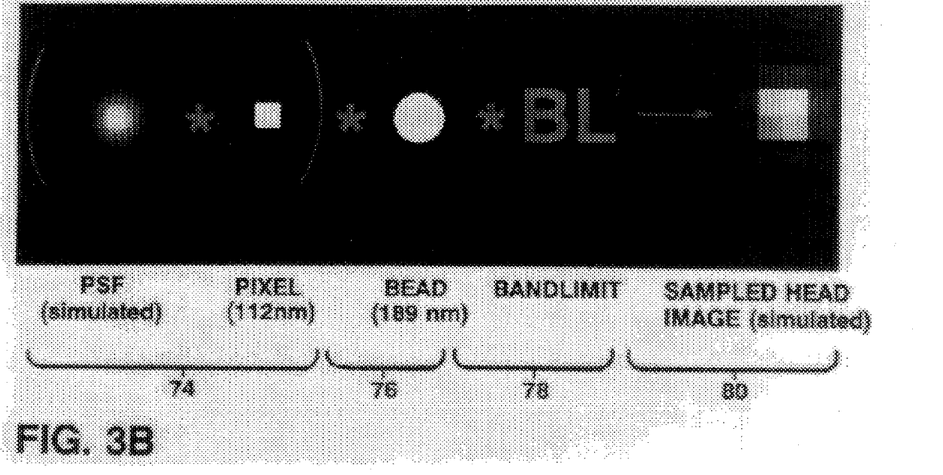
FIG. 3B is a series of images, generated using a computer simulation, which illustrate reconstruction of a digitized image of a bead.

With reference now to FIGS. 3A and 3B, the finely resolved PSF is determined by imaging a bead having a known size to generate a relatively low-resolution digital image 70. In the image shown in the figure, the image was collected using a 1.4 NA oil-immersion lens and a Prometrix CCD camera having square, 112 nm×112 nm pixels. The measured bead image can be represented mathematically using the equation:

$$\text{Bead Image} = (PSF*PIXEL(x,y))*(BEAD(x,y,z),BL) \quad (1)$$

where PIXEL(x,y) represents the two-dimensional sensitivity profile of the light-detecting region of the pixel, BL is the spatial band limit (i.e., the spatial frequency transmission function) of the imaging system, and BEAD(x,y,z) is the dye distribution in the bead. The BL essentially represents a band-pass filtering function indicative of the maximum spatial frequencies of the sample which can be measured using the instrument, and is determined by the geometrical relationship between the imaging optics and the sample. Typically, BEAD(x,y,z) has a value of 1 inside the diameter of the bead, and 0 outside the diameter. The PIXEL, BL, and BEAD quantities of equation 1 are known quantities inherent to the detector and imaging system, and the thus PSF can be determined. Using the processing method described in detail below, PSF*PIXEL(x,y) can thus be determined with finer sampling than the detector's pixel size. In other words, the experimentally determined bead image results from convolution of the actual bead image (which is known) and the unknown PSF; working backwards from the measured image allows the PSF to be determined on the fine numerical grid. Errors in this determination are reduced by using a large bead (e.g., having a diameter between about 100–200 nm) instead of a point source of light.

The region 72 shows the PSF in the xy plane determined using the bead image shown in region 70. In this case, the sub-pixels in the PSF have an area of 28 nm×28 nm. Verification of the image-reconstruction process is indicated by the simulated images shown in FIG. 3B. Here, a simulated PSF is convolved with a measuring pixel having an area of 112 nm×112 nm (region 74). This convolution product represents the (PSF*PIXEL(x,y)) component of equation 1, above. This product, in turn, is convolved with a known bead size of 189 nm (region 76) and then with a band limit function (region 78) to yield a simulation of the measured image (region 80). These steps are equivalent to the (BEAD(x,y,z)*BL) component of equation 1. A preferred algorithm for determining the PSF expressed in psuedo-code is included in Appendix A.

Once determined, the PSF is represented numerically by a three-dimensional array of data points, and can be stored in the processing systems memory unit. Mathematically, the PSF can be represented by an essentially continuous function, although in actuality the stored function is discretely measured, with the separation between individual sub-pixels being arbitrarily small. For instance, in FIGS. 3A and 3B, the sub-pixels have a width of 28 nm×28 nm, although smaller sizes can also be used.

The PSF is used in combination with the image-processing method to reconstruct an image of the object. The method can be used, for example, to determine a dye density function (DDF) in a sample. This distribution represents the spatial locations of light-emitting dye molecules, or other light-emitting components, in the sample.

Figure 4A:
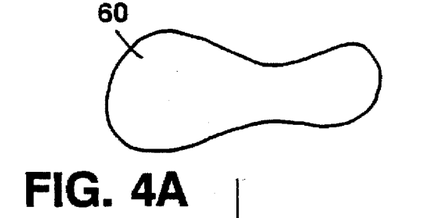
FIGS. 4A–4C are side views of, respectively, the object to be imaged, a digitized image of the object measured with a digital detector, and a reconstructed image of the object.
Figure 4B:
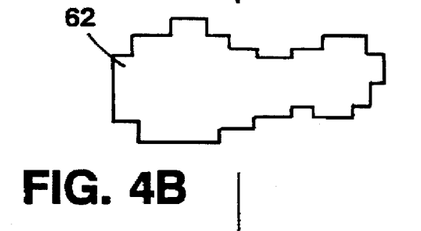
Figure 4C:
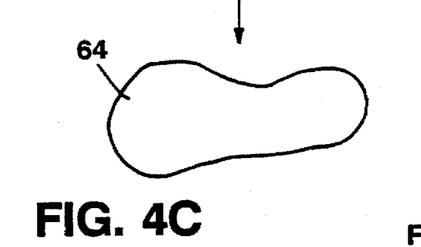

With reference now to FIGS. 4A–4C, during an imaging process, light emanating from a sample 60 is imaged onto a detector where it is processed to generate an electronic, low-resolution representation of the image 62. Here, the squared-off, low-resolution nature of the image is due to the size of the light-measuring CCD pixels (typically 100 nm ×100 nm) relative to the sizes of the object's features. The image 62 is then processed using the method described in detail below. Using the determined PSF, the detector response is accounted for and deconvolved from the image 62 to yield the reconstructed image 64. As indicated by the similarity of the sample and resultant image, reconstruction in this manner is used to generate high-resolution images in which most of the object's fine features are retained.

Figure 2B:
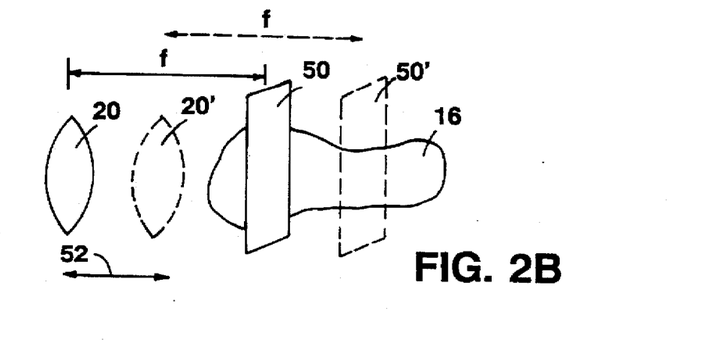

Three-dimensional images of the sample are reconstructed by acquiring sections spaced along a particular axis of the sample. Referring now to FIG. 2B, sections may be obtained by positioning the lens 20 at various distances from the sample 16 (shown in the figure as being along the z axis), collecting light emanating primarily from a section 50 lying at the focal plane (spaced by a distance f) of the lens 20, and then imaging this light onto the optical detector. Electronic signals representative of the section 50 are digitized and stored as a two-dimensional array of data points. The position of the lens relative to the sample is then adjusted (as indicated by the arrow 52 in the figure) to image a new section 50' lying at the adjusted focal plane. This results in generation of a separate array of two-dimensional, coarsely sampled data points.

The collection of two-dimensional digital images, when combined, represents a three-dimensional image. These data points are stored in the processing system's memory unit until processing. Although two optical sections are indicated in FIG. 2B, it is understood that to accurately reconstruct the image, sections are acquired at multiple planes along the z axis. Once the necessary sections are acquired, the data is processed using the known PSF and the method described below to determine the high-resolution image.

At each optical section, each pixel in the CCD detects light from a considerable volume in the sample; the relative position between the light-emitting portion of the sample and the imaging lens's focal plane determines how much light is detected by the pixel. Thus, for a particular optical arrangement, the light collected by a pixel i is a sum of the light emitted from all points in the volume of the sample weighted by the PSF, i.e., $$g_i = \int \int \int_V k_i(x,y,z)f(x,y,z)dxdydz \quad i=1,2,3,\ldots N \quad (4)$$

where $g_i$ is a point representing the light collected by a particular pixel i, $k_i(x,y,z)$ is the three-dimensional PSF for a pixel i at $(x_i,y_i,z_i)$, $f(x,y,z)$ is the three-dimensional DDF along $(x,y,z)$, V is a volume containing the light-emitting portion of the sample, and N is the number of sub-pixels. The vector g contains all the points $g_i$. The actual measurement, $g'_i$, will include noise introduced by the optical measuring system.

The points $g_i$ can be collected from arbitrary locations along the x, y, and z axes. For example, if a scanning confocal microscope translating along the x, y, and z axes is used to acquire the image, the points may be acquired at any point over which the scanning lens traverses. For a standard microscope/CCD imaging system, an array of sampling points are taken from the entire xy plane for a point along the z axis (i.e., the plane of focus); the focus along the z axis is then adjusted, and a new set of points along the xy plane are acquired.

An iterative procedure is used to find a DDF which numerically minimizes equation 5, below $$\Phi(f) = \sum_{i=1}^{N} \left| g_i - \int \int_V \int k_i(x,y,z)f(x,y,z)dxdydz \right|^2 + \quad (5)$$

$$\alpha \int \int_V \int |f(x,y,z)|^2 dxdydz$$

where $\alpha$ is a balancing term which selectively weights the need to fit the actual measured data (i.e., the first term in equation 5) and the need to stabilize the estimated term (i.e., the second term in equation 5). In general, $\alpha$ is fixed following inspection of the resultant image, with a single value being generally adequate for all the images in a given experiment.

The minimization process is simplified by making the assumption that the DDF is non-negative, i.e., $f(x,y,z) \leq 0$. In other words, to image the sample, portions which emit, reflect, or transmit optical radiation are contained therein.

Finding a continuous function $f(x,y,z)$ which minimizes $\Phi(f)$ is a constrained infinite dimensional optimization problem. $\Phi(f)$ is a continuous, strictly convex function of $L^2(V)$ and thus has a unique minimum on the closed convex set of non-negative functions in $L^2(V)$. ($L^2(V)$ is notation for a set of functions for which the integral for the absolute value of $f(x,y,z)^2$ is finite.) The minimum, non-negative DDF has the form $$f(x,y,z) = \max\left(0, \sum_{i=1}^{N} c_i k_i(x,y,z)\right) \quad (6)$$

where c is an N-dimensional vector that minimizes $$\Psi(c) = \quad (7)$$

$$\frac{1}{2}\left[\int \int_V \int \left(\max\left(0, \sum_{i=1}^{N} c_i k_i(x,y,z)\right)\right)^2 dxdydz + \alpha |c|^2\right] - \sum_{i=1}^{N} c_i g_i$$

This function, $\Psi(c)$, is finite dimensional (the dimension of c is the same as that of the points, g), strictly convex, and twice differentiable. Its gradient is calculated, and a conjugate gradient method applied to find the unique c that minimizes $\Psi(c)$. The DDF is the function $f(x,y,z)$ for the c that minimizes $\Psi(c)$. Since this formulation consistently treats the $f(x,y,z)$ as a function defined on a continuous domain, the image-processing method allows a continuous DDF to be determined. A preferred algorithm expressed in psuedo-code used to determine the DDF is listed in Appendix B. Additional details concerning the mathematics used in the image-processing methods are described in Carrington, "Image Restoration in 3D Microscopy with Limited Data", SPIE Vol. 1205, Bioimaging and Two-Dimensional Spectroscopy, (1990), the contents of which are incorporated hereinby reference.

The minimization process can be simplified using several mathematical operations. For example, the minimizing function can be determined by taking the derivative of equation 5, and then setting this equal to 0. Other techniques which can be used to minimize equation 5 are described in Butler et al., S. I. A. M. J. Numer. Anal. 19:381–397 (1982), the contents of which are incorporated herein by reference.

Minimization of equation 5 does not require that the section planes be taken at periodic, equal distances along the z axis of the samples. The sections, in fact, may be taken at arbitrary spacings. In general, image processing can be accomplished using seven or less section planes. Images obtained at closely spaced planes provide higher-solution information concerning, for example, a particular region of the object, while planes spaced further apart above and below the object provide the necessary coarse information concerning light contribution from more distant regions.

Since the images for each plane may be recorded simultaneously for the entire field, information for the three-dimensional image can be acquired in relatively brief intervals (as short as 15 msec.). This minimizes motion-related effects in the image which can lead to blurring.

In addition, the DDF determined using the above process can be used to estimate the image of an optical scene lying outside the detector viewing area, and can thus be used to compensate for "edge effects" in the imaging. This is done by extending the volume V beyond the field of view of the detector and beyond the z range of the optical sections acquired, and is used to eliminate edge effects which may be present in data which are truncated in prior imaging systems. In addition, because data outside the detector's view can be estimated, the acquired data can be reduced to a series of smaller sub-images in the xy plane. At the edge of the light-sensitive region of the detector, the dye density resulting in light "blurring in" from outside the sub-image can be calculated. Each sub-image can then be processed separately using, for example, a parallel processing computing machine or a small, commercially available computer.

The following examples are used to more clearly describe the image-processing method of the invention.

EXAMPLES

In a particular example, the imaging system 10 can be used for fluorescence microscopy and detection of fluorescing materials in biological samples, such as cells. In this application, cells of interest are exposed to compounds containing both dye and a targeting agent, such as an antibody. The dye/target compounds are then distributed about the cell where they selectively bind to sites specific to the targeting agent. Following irradiation with an external light source, fluorescence is induced in the cell at the labeled sites, and then imaged and processed with the imaging system 10 to determine specific properties of the cell.

Figure 5A:
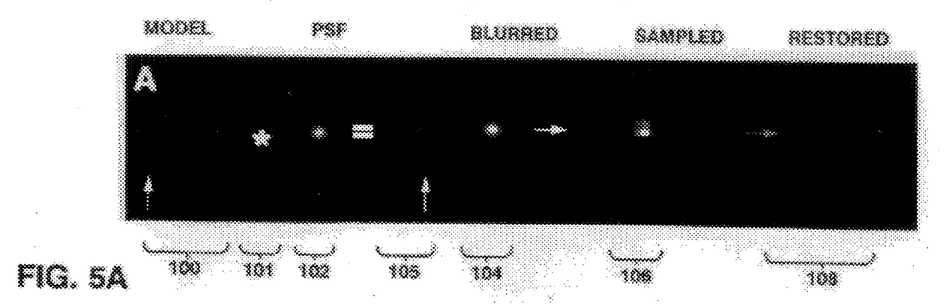
FIGS. 5A and 5B are a series of images generated using a computer simulation which illustrate reconstruction of a measured image along, respectively, the xy and xz planes.
Figure 5B:
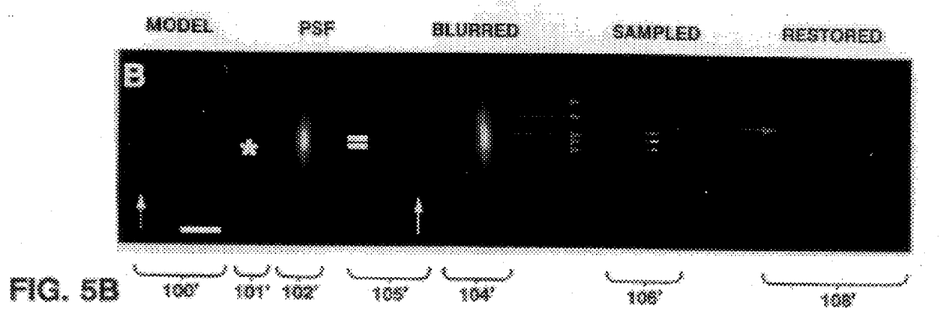
Figure 6A:
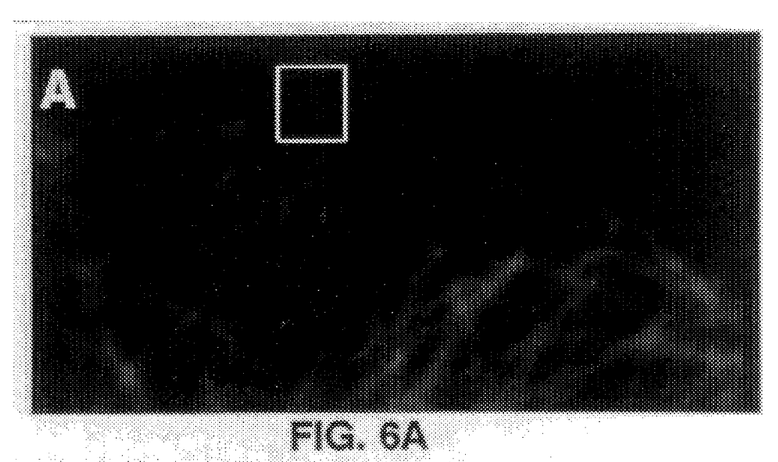
FIGS. 6A–6C are, respectively, an optically measured image of fluorescently labeled microtubules in a NRK-1 cell, an expanded view of the image, and an image reconstructed according to the invention.
Figure 6B:
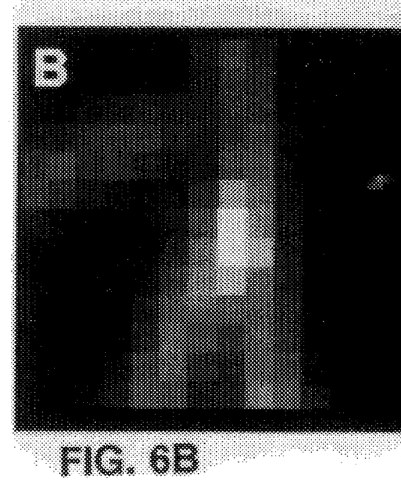

Referring now to FIGS. 5A and 5B, computer simulations of the discrete/continuous imaging process illustrates the various steps used during image reconstruction. The simulation allows modeling of image reconstruction along an xy plane parallel to the measuring plane of the detector (FIG. 5A) and xz plane orthogonal to the measuring plane (FIG. 5B). In the simulation, the object to be imaged in the xy plane consists of four point sources (located in the regions 100, 100') of equal brightness positioned at coordinates (−0.1, 0, 0), (4.1, 0, 0), (4.2, 0, 0), and (4.1, 0, 0.4) microns. Point sources on the right-hand side of the vertical arrows are within the field of view of the detector, while objects to the left of these arrows lie out of the detector's field of view. The continuous nature of the model is approximated by plotting the point sources and the PSF on a grid having 25×25×25-nm sub-pixels. The scale bar shown in the bottom-most portion of the region 100' in FIG. 6B has a length of 500 microns.

The PSF 102, 102' used for the simulations is calculated for an ideal 1.4 NA objective lens used in a conventional microscope. When viewed in the xy and xz planes, the PSF has, respectively, circular and elliptical cross sections. Convolution of the PSF and the object, indicated in the figure by the "*" sign in the regions 101, 101', results in blurred images in regions 104, 104' which correspondingly have, respectively, circular and elliptical cross sections in the xy and xz planes. As shown in the regions 105 and 105', following convolution with the PSF, blurred images of objects lying outside the detector's field of view (i.e, objects to the left of the vertical arrows in regions 100, 100') have a weak but detectable intensity.

Section 106 in FIG. 5A shows a simulation of the image as measured with a detector (i.e., a CCD) having a two-dimensional array of light-sensitive regions, each of which has a large, square area relative to the grid spacing in the object. The simulation uses CCD pixels which are 100 nm×100 nm to sample the image shown in the region 104. As described above, these images are plotted on a 25 nm×25 nm grid; each CCD pixel therefore encompasses 16 of the image's sub-pixels. Each 100-nm pixel in the CCD-measured image thus represents a light intensity equivalent to the collective intensity of all the object's encompassed sub-pixels.

Optical sectioning of the image, as would be performed during an actual measurement procedure, is simulated in region 106' in FIG. 5B. Here, sections of the image are taken at different planes of focus along the xz plane. In the simulated image, spacing between the section along the z axis is non-periodic: sections are taken at z=0.0, 0.1, 0.2, 0.4, and 0.6. As is clear from the arrows, along the z axis the simulated light distribution from the fluorescing cell extends beyond the measured regions.

The simulated, sampled images along the xy and xz planes shown in regions 106 and 106' are reconstructed using the image-processing method described in detail above. Based on knowledge of the PSF, the measured image is processed by minimizing a function having the form of equation 5. This allows determination of the DDF for the system, which is plotted in regions 108 and 108' on the 25 nm×25 nm×25 nm grid. Comparison of regions 100 and 108 in FIG. 5A indicate that while slightly blurred, the reconstructed image retains most of the fine features of the actual object. In addition, using the processing method described above, the light-emitting object lying outside the viewing region of the detector shown in the left-hand side of region 100 can be reconstructed with the same high resolution, and is only slightly blurred.

Similarly, as shown in region 108 in FIG. 5B, the images in the xz plane can be reconstructed so that many of their fine features are retained. In this case, elongation of the image along the z axis is due to convolution with the PSF, which has an elliptical cross section in the xz plane.

During processing of the images in FIGS. 5A and 5B, 1200 iterations were used to determine the DDF, and $\alpha=10^{-11}$.

Figure 6C:
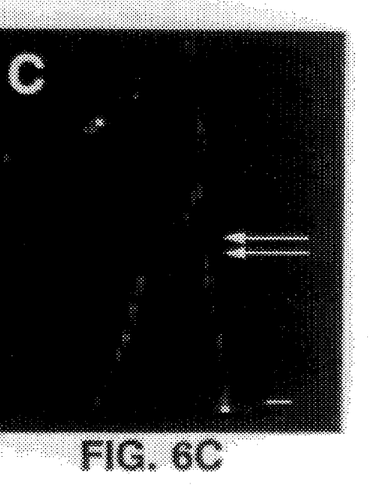
Figure 7A:
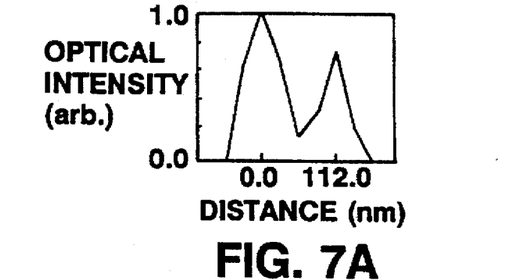
FIGS. 7A and 7B are two-dimensional plots of the optical intensity as a function of distance taken at the arrows in FIG. 6C.
Figure 7B:
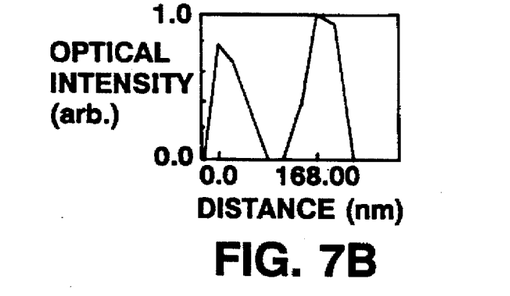

With reference now to FIGS. 6A–6C and 7A–7B, the image-restoration method described above was used to generate a high-resolution image of fluorescently labeled microtubules in an NRK-1 cell. In the experiment, two-dimensional images were collected with a 60X Nikon camera ns (NA=1.4) and a Prometrix CCD camera. The optical system had a resolution of 112 nm/pixel. FIG. 7A provides an optically measured image of a 0.35-micron thick portion of the cell. The measured fluorescence shown in the figure is expanded in FIG. 6B to show a relatively low-resolution image of the microtubules. Using the processing method described above, image restoration was performed on the measured image in FIG. 6B, yielding the relatively high resolution image in FIG. 6C. The reconstructed image is plotted on a grid having a 28-nm spacing between sub-pixels, and has adequate resolution to indicate that the microtubules are connected for some distance before branching. Two-dimensional plots taken from the reconstructed image at the arrows in FIG. 6C are shown in FIGS. 7B and 7C. As is clear from these plots, finely resolved image features (in this case, the individual microtubules) which are lost in the measured data can be clearly viewed following image reconstruction.

During processing of the images in FIGS. 6A–6C, 2000 iterations were used to determine the DDF, and $\alpha=10^{-8}$.

The image-restoration method described above was used to reconstruct an optically measured image taken from an enzymatically isolated smooth muscle cell from a guinea pig bladder. Prior to imaging, the cell was exposed to rhodamine and fluorescein-tagged antibodies specific for the dihydropyridine and ryanodine receptors. Once exposed to the labeled antibodies, receptor images were taken using the standard electronic imaging system described above (Nikon 60 1.4 NA oil-immersion lens in combination with a Prometrix CCD). With reference now to FIGS. 8A–8F, the optically measured images of the ryanodine (FIG. 8A) and dihydropyridine (FIG. 8D) are blurred due to relatively low spatial resolution of the sampling CCD. The image provides only a vague indication of the locations of the two receptors. The white boxes shown in FIGS. 8A and 8D indicate, respectively, the ryanodine and dihydropyridine receptors. All bars in the figures indicate a 1 micron scale.

Figure 8A:
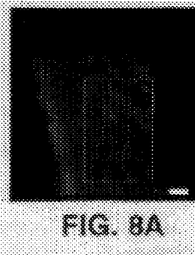
FIGS. 8A–8C are computer-generated images that show detected and processed images of fluorescently labeled ryanodine receptors in a smooth muscle cell sample.
Figure 8B:
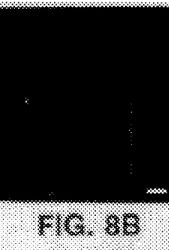
Figure 8C:
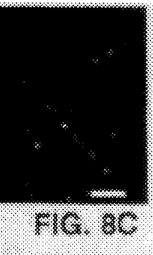
Figure 8D:
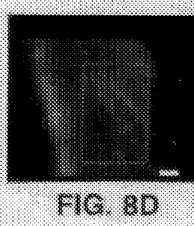
FIGS. 8D–8F are computer-generated images that show detected and processed images of fluorescently labeled dihydropyridine receptors in a smooth muscle cell sample.
Figure 8E:
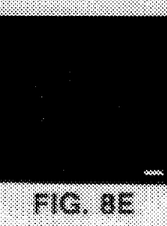
Figure 8F:
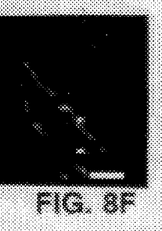

The measured images were processed using the method described in detail above to yield the restored images shown in FIGS. 8B and 8E. The images are restored and plotted on a grid having sub-pixel dimensions of 93 nm×93 nm×250 nm. Further resolution may be provided simply by defining in the processing algorithm of Appendices A and B a grid having higher resolution. For example, the images shown in FIGS. 8C and 8F are plotted using sub-pixel having volumes of 46.5 nm×46.5 nm×125 nm, thereby increasing the resolution by a factor of two. Analysis of the two images indicates that when restored and viewed using sub-pixel resolution, the two receptors have nearly identical patterns of light distribution.

During processing of the images in FIGS. 8A–8F, 120 iterations were used to determine the DDF, and $\alpha=3\times10^{-5}$.

Referring now to FIGS. 9A–9E, in another example, the movement of hexokinase in response to a metabolic perturbation can be monitored by imaging a fluorescent analog of this enzyme in a living cell. Previous studies with isolated mitochondria indicated that hexokinase specifically binds to sites on the mitochondrial membrane, and that this binding increases the efficiency of hexokinase. In addition, this association may be regulated by metabolic products.

To test for this mechanism, rhodamine labeled hexokinase was microinjected into an A7R5 cultured smooth muscle cell. Sets of images at 7 symmetrically spaced focal planes were acquired at varying times after injection of labeled hexokinase.

Figure 9A:
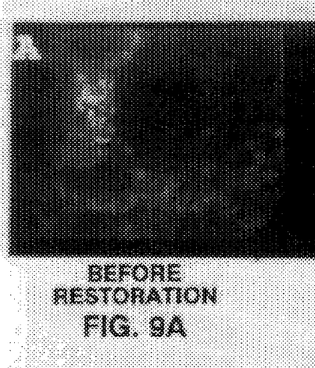
FIGS. 9A–9F are images processed according to the invention of fluorescently labeled hexokinase distributed in a smooth muscle cell at various time intervals; and, FIG. 10 is a plot of the time-dependent density ratio of hexokinase located in the mitochondria and cytoplasm in the cell.
Figure 9B:
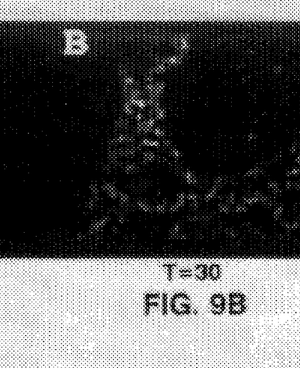
Figure 9C:
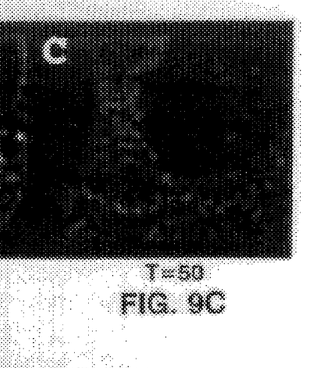
Figure 9D:
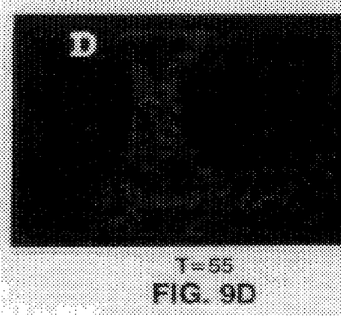
Figure 9E:
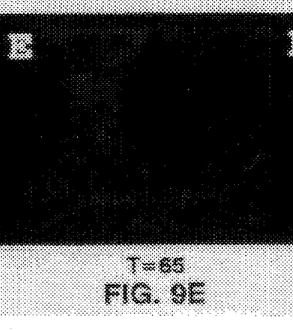
Figure 9F:
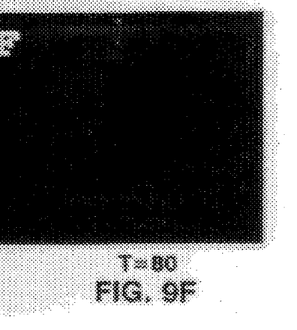

Images were formed following processing of optical sections taken along the z axis (z=−1.5, −0.75, −0.25, 0, 0.25, 0.75, and 1.5 microns). The experimentally measured image in FIG. 9A was taken 30 minutes after addition of hexokinase; the same image is shown in FIG. 9B after restoration. Restored images taken at time intervals of 50, 55, 65, and 80 minutes are also shown in FIGS. 9C–9F, respectively. The data indicate that following injection, the labeled hexokinase becomes associated with organelles identified as mitochondria; a steady state of the association is reached after 30 minutes.

Figure 10:
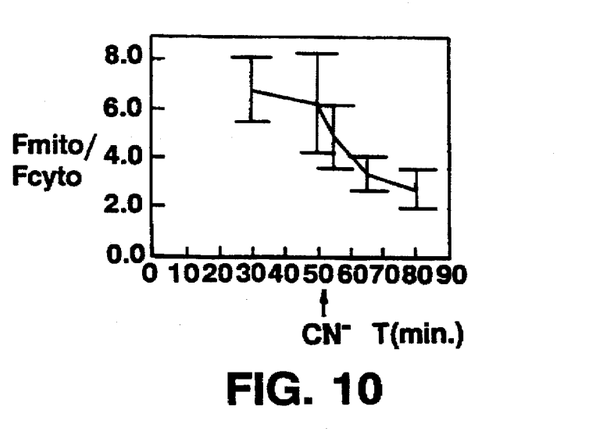

NaCN was added to the cell at 51 minutes to inhibit oxidative metabolism in the cell. A ratio of the fluorescence intensity of localized hexokinase relative to the intensity in a region near the mitochondrion, but not localized, was computed. The ratio of the density of hexokinase associated with the mitochondrion versus that in the cytoplasm was calculated for the same eight mitochondria in each image. This ratio, $F_{mito}/F_{cyto}$, is plotted in FIG. 10. Error bars in the figure indicate the standard deviation of the absolute ratio values measured for the eight mitochondria. As is clear from the data, a prompt delocalization of hexokinase from mitochondrial binding sites is induced following inhibition of oxidative metabolism. Dissociation of hexokinase was also detected in response to 2-Deoxy-glucose (data not shown), a treatment expected to raise cellular levels of glucose-6-phosphate. Increases in the concentration of glucose-6-phosphate have been shown to inhibit hexokinase binding to isolated mitochondria in vitro. Hence, these imaging methods provide direct support for the role of glucose-6-phosphate in regulating hexokinase binding to mitochondria in living cells. Furthermore, the images allow determination that this binding process is regulated by the metabolic state of mitochondria. Recent results suggest that the energy state of individual mitochondria inside a living cell may oscillate (Loew et al., J. Biophysics 65, 2396–2407 (1993)), raising the possibility that hexokinase binding in living cells may also vary locally, a suggestion that can be directly tested with these imaging methods.

During processing of the images in FIGS. 9A–9F, 40 iterations were used to determine the DDF, and $\alpha=0.005$.

Other Embodiments

It is to be understood that while the invention has been described in conjunction with the detailed description thereof, that the foregoing description is intended to illustrate and not limit the scope of the invention, which is defined by the scope of the appended claims. Other aspects, advantages, and modifications are within the scope of the following claims.

---

APPENDIX A

Pseudo-code for calculation of sub-pixel PSF:
    Set interpolation factor (i.e. subpixel spacing)
    Determine the bandlimit of the microscope
        Calculate theoretical bandlimit,
        OR Measure the bandlimit from the calculated Fourier Transform of a 3-D
            image of a fluorescent bead.
    Calculate a function BL(x,y,z) (defined on the subpixel grid) whose Fourier
        Transform is 0 outside a volume containing the determined bandlimit
        and is 1 inside that volume. Usually, the volume is chosen to be a cylinder
        somewhat larger than the non-zero region of the Fourier Transform of the
        bead image
    Calculate a function BEAD(x,y,z) (defined on the subpixel grid) to be
        BEAD(x,y,z) = 1 if (x,y,z) is inside the diameter of the fluorescent bead
            = 0 if(x,y,z) is outside the diameter of the fluorescent bead
    Calculate the convolution BEAD*BL
    Perform a subpixel restoration using the measured image of the fluorescent bead as
        data and using BEAD*BL as the PSF.
    Write the resulting function as the finely sampled PSF to be used for subsequent
        subpixel image restorations.

---

APPENDIX B

The algorithm expressed in pseudo-code is then:
INITIALIZATION:
    Set interpolation factor in x,y and z.
    Measure or calculate subpixel PSF (see Appendix A)
    Read in data image, g.
    Set z positions of optical sections.
    Choose initial value of the vector c.
        Usually c = 0 or c = Mean intensity of the data image.

APPENDIX B-continued

Initialize other variables.
ITERATIONS:
REPEAT
  Calculate the gradient, $\psi'(c)$ $$[\psi'(c)]_i = \int\int\int_V k_i(x,y,z)\max\left(0, \sum_{j=1}^{N} c_j k_j(x,y,z)\right) dxdydz + \alpha c_i - \tilde{g}_i.$$

Determine Search Direction
  (Fletcher-Reeves):
    $\Delta c = -\psi'(c) + \beta(\text{old}\Delta c)$  where $\beta = \|\psi'(c)\|_2^2 / \|\psi'(\text{old}c)\|_2^2$ OR (Poljak-Ribiere):
    $\Delta c = -\psi'(c) + \beta(\text{old}\Delta c)$  where $\beta = \psi'(c) \cdot (\psi'(c) - \psi'(\text{old}c)) / \|\psi'(\text{old}c)\|_2^2$ Perform Line Search
  Find $t = t_o$ that minimizes $\psi(c + t\Delta c)$
  Set new value of $c = c + t_o \Delta c$
UNTIL (Convergence criteria are satisfied) OR (maximum allowed number of iterations)

Calculate dye density as $f(x,y,z) = \max\left(0, \sum_{i=1}^{N} c_i k_i(x,y,z)\right)$

What is claimed is:

1. A method for processing a digitized image to form a processed image, said method comprising:
   generating a digitized image using an image-measuring system and representing said image as a vector g,
   determining for said measuring system a point spread function (PSF) and representing said PSF as a function k(x,y,z), said PSF comprising sub-pixels having a closer spacing than points in said vector g, and
   processing said vector g and said function k(x,y,z) by:
   (a) selecting a vector c;
   (b) calculating the value of $\Psi(c)$ using said vector g, said selected vector c, and said function k(x,y,z), where
   and wherein $\alpha$ is a balancing term and V is a volume element;

$$\psi(c) = \frac{1}{2}\left[\iiint_V \left(\max\left(0, \sum_{i=1}^{N} c_i k_i(x,y,z)\right)\right)^2 dxdydz + \alpha \|c\|^2\right] - \sum_{i=1}^{N} c_i g_i,$$

and,
   (c) iteratively repeating steps (a) and (b) to determine a value for c that minimizes $\Psi(c)$; and,
   reconstructing said digitized image to form said processed by including in $$f(x,y,z) = \max\left(0, \sum_{i=1}^{N} c_i k_i(x,y,z)\right)$$

said value for c that minimizes $\Psi(c)$ so that said processed image comprises sub-pixels having a closer spacing than said points of said vector g.

2. The method of claim 1, wherein said spacing of said sub-pixels of f(x,y,z) is selected during said processing.

3. The method of claim 1, wherein said digitized image is generated by a CCD comprising an array of pixels.

4. The method of claim 3, wherein said sub-pixels of said processed image have a closer spacing than said pixels of said CCD.

5. The method of claim 1, further comprising generating multiple digitized images prior to said processing.

6. The method of claim 5, wherein said multiple digitized images are taken from multiple sections of an object using an optical system.

7. The method of claim 6, wherein said optical system includes a lens, and said multiple digitized images are generated by adjusting a position of said lens relative to said object.

8. The method of claim 5, further comprising sequentially processing said multiple digitized images during said processing.

9. The method of claim 1, wherein said PSF is determined using a digitized image of a light-emitting object having a known size.

10. The method of claim 9, wherein said digitized image is generated by a CCD comprising an array of pixels.

11. The method of claim 9, further comprising generating multiple digitized images of said object having a known size.

12. The method of claim 11, wherein said multiple digitized images are taken using an optical system from multiple sections of said object having a known size.

13. The method of claim 9, wherein said light-emitting object is a fluorescent sphere having a known diameter.

14. The method of claim 13, wherein said PSF is determined by first generating a digital image of said light-emitting object, and then solving for said PSF using the equation:

digital image=(PSF*PIXEL(x,y))*(BEAD(x,y,z)*BL)

wherein PIXEL(x,y) is a function that describes a light sensitivity profile of said pixel of said CCD, BL is a spatial band limit of said optical system, and BEAD(x,y,z) is a dye distribution in said fluorescent sphere.

15. The method of claim 1, wherein processing and reconstructing are performed using a computer.

16. A method for increasing the resolution of a detector comprising an array of pixels, said method comprising:
   generating a digitized image using said detector and representing said image as a vector g,
   determining for said detector a point spread function (PSF) and representing said PSF as a function k(x,y,z), said PSF comprising sub-pixels having a closer spacing than said pixels of said detector, and processing said vector g and said function k(x,y,z) by:
(a) selecting a vector c;
(b) calculating the value of $\Psi(c)$ using said vector g, said selected vector c, and said function k(x,y,z) where $$\Psi(c) = \frac{1}{2}\left[\iiint_V \left(\max\left(0, \sum_{i=1}^{N} c_i k_i(x,y,z)\right)\right)^2 dxdydz + \alpha|c|^2\right] - \sum_{i=1}^{N} c_i g_i,$$

and wherein $\alpha$ is a balancing term and V is a volume element; and,
(c) iteratively repeating steps (a) and (b) to determine a value for c that minimizes $\Psi(c)$; and, reconstructing said digitized image to form a processed image by substituting in $$f(x,y,z) = \max\left(0, \sum_{i=1}^{N} c_i k_i(x,y,z)\right)$$

said value for c that minimizes $\Psi(c)$ so that said processed image comprises sub-pixels having a closer spacing than said pixels of said detector, thereby increasing the resolution of said detector.

17. The method of claim 16, wherein said detector is a charge-coupled device (CCD).

18. An image-measuring system for generating a high-resolution digital image, said system comprising:

an imaging system comprising a lens and a detector containing pixels, said imaging system generating a first digital image of a sample represented by a vector g, and for generating a point spread function (PSF) represented as a function k(x,y,z), said PSF comprising sub-pixels having a closer spacing than said pixels, and a processor configured to process said vector g and said function k(x,y,z) by:
(a) selecting a vector c;
(b) calculating the value of $\Psi(c)$ using said vector g, said selected vector c, and said function k(x,y,z), where $$\Psi(c) = \frac{1}{2}\left[\iiint_V \left(\max\left(0, \sum_{i=1}^{N} c_i k_i(x,y,z)\right)\right)^2 dxdydz + \alpha|c|^2\right] - \sum_{i=1}^{N} c_i g_i,$$

and wherein $\alpha$ is a balancing term and V is a volume element;
(c) iteratively repeating steps (a) and (b) to determine a value for c that minimizes $\Psi(c)$; and, reconstructing said digitized image to form high-resolution digital image said by substituting in $$f(x,y,z) = \max\left(0, \sum_{i=1}^{N} c_i k_i(x,y,z)\right)$$

said value for c that minimizes $\Psi(c)$ so that said processed image comprises sub-pixels having a closer spacing than said points of said vector g.

19. The image-measuring system of claim 18, wherein said processor is a computer.

20. The image-measuring system of claim 18, wherein said detector is a CCD camera.

* * * * *